United States Patent
Bhamidipati et al.

(10) Patent No.: US 9,144,094 B2
(45) Date of Patent: Sep. 22, 2015

(54) ESTABLISHING A WIRELESS DISPLAY SESSION BETWEEN A COMPUTING DEVICE AND A VEHICLE HEAD UNIT

(71) Applicant: QUALCOMM Incorporated, San Diego, CA (US)

(72) Inventors: PhaniKumar K. Bhamidipati, San Diego, CA (US); Vijayalakshmi R. Raveendran, San Diego, CA (US); Xiaolong Huang, San Diego, CA (US); Xiaodong Wang, San Diego, CA (US); Hongyu Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 13/801,118

(22) Filed: Mar. 13, 2013

(65) Prior Publication Data

US 2014/0120829 A1 May 1, 2014

Related U.S. Application Data

(60) Provisional application No. 61/729,917, filed on Nov. 26, 2012, provisional application No. 61/719,873, filed on Oct. 29, 2012.

(51) Int. Cl.
*H04M 1/00* (2006.01)
*H04W 76/02* (2009.01)
*H04N 21/422* (2011.01)
*H04N 21/436* (2011.01)
(Continued)

(52) U.S. Cl.
CPC .............. *H04W 76/02* (2013.01); *H04L 67/12* (2013.01); *H04N 21/42207* (2013.01); *H04N 21/43615* (2013.01); *H04N 21/43637* (2013.01)

(58) Field of Classification Search
USPC .................. 455/550.1, 569.1, 556, 41.1–41.3
See application file for complete search history.

(56) References Cited

U.S. PATENT DOCUMENTS

| 8,818,275 | B2 * | 8/2014 | Khamharn ................. 455/41.2 |
| 8,914,187 | B2 * | 12/2014 | Wang et al. ................. 701/32.7 |
| 2012/0127937 | A1 | 5/2012 | Singh et al. |

(Continued)

OTHER PUBLICATIONS

Bose et al. ("Terminal Mode—Transforming Mobile Devices into Automotive Application Platforms", Proceedings of the Second International Conference on Automotive User Interfaces and Interactive Vehicular Applications, Nov. 11, 2010, pp. 148-155.*

(Continued)

*Primary Examiner* — Fayyaz Alam
(74) *Attorney, Agent, or Firm* — Donald C. Kordich

(57) ABSTRACT

This disclosure describes a method of transmitting media data from a source device, the method comprising establishing, with the source device, a first communication session between the source device and a sink device comprising a vehicle head unit, wherein the first communication session conforms to a communication protocol. The method also comprises discovering, with the source device and by the first communication session, the sink device. The method further comprises, during operation of the first communication session, establishing with the source device a second communication session between the source device and the sink device, wherein the second communication session conforms to a wireless display protocol. The method also comprises transmitting, using the second communication session, media data from the source device to the sink device for output to an interface of the sink device.

40 Claims, 8 Drawing Sheets

(51) Int. Cl.
  *H04N 21/4363* (2011.01)
  *H04L 29/08* (2006.01)

(56) References Cited

U.S. PATENT DOCUMENTS

2012/0250576 A1 10/2012 Rajamani et al.
2012/0297458 A1 11/2012 Tom
2013/0067331 A1 3/2013 Glazer et al.

OTHER PUBLICATIONS

Bose R., et al., "Morphing Smartphones into Automotive Application Platforms", Computer, IEEE, US, vol. 44, No. 5, May 1, 2011, pp. 53-61, XP011477975, ISSN: 0018-9162, DOI: 10.1109/MC.2011.126.

International Search Report and Written Opinion—PCT/US2013/066965—ISA/EPO—Feb. 4, 2014.

Wi-Fi Alliance, "Wi-Fi Certified MiracastTM Extending the Wi-Fi experience to seamless video display", https://www.wi-fi.org/sites/default/files/uploads/wp_Miracast_Industry_20120919.pdf, pp. 3-12, Sep. 19, 2012.

Wi-Fi Display Technical Specification Version 1.0.0, Wi-Fi Alliance Specification, Aug. 24, 2012, 149 pages, XP009172467.

CES 2013—JVC Newsroom, "JVC Mobile Entertainment Debuts Two New Mirrorlink-Enabled Multimedia Receivers In 2013 For A Safe And Optimized Driving Environment," Jan. 8, 2013, See paragraphs 4-6, Retrieved from <URL: http://newsroom.jvc.com/press-releases/mobile/jvc-mobile-entertainment-debuts-two-new-mirrorlink-enabled-multimedia-receivers-in-2013-for-a-safe-and-optimized-driving-environment/> 4 pages.

\* cited by examiner

ESTABLISHING A WIRELESS DISPLAY SESSION BETWEEN A COMPUTING DEVICE AND A VEHICLE HEAD UNIT

This application claims the benefit of U.S. Provisional Application No. 61/729,917, filed Nov. 26, 2012; and U.S. Provisional Application No. 61/719,873, filed Oct. 29, 2012; the entire content of each of which is incorporated herein by reference in its entirety.

TECHNICAL FIELD

The disclosure relates to techniques for establishing a communication link between a wireless device and a head unit on an automobile or other vehicle, as well as devices that implement such techniques.

BACKGROUND

Wireless display (WD) systems include a source device and one or more sink devices. A source device may be a device that is capable of transmitting media data. A sink device may be a device that is capable of receiving and rendering media data. The source device and the sink devices may be either mobile devices or wired devices. As mobile devices, for example, the source device and the sink devices may include mobile telephones, portable computers with wireless communication cards, personal digital assistants (PDAs), portable media players, digital image capturing devices, such as a camera or camcorder, or other flash memory devices with wireless communication capabilities, including so-called "smart" phones and "smart" pads or tablets, or other types of wireless communication devices. As wired devices, for example, the source device and the sink devices may comprise televisions, desktop computers, monitors, projectors, printers, audio amplifiers, set top boxes, gaming consoles, routers, and digital video disc (DVD) players, and media servers.

A source device may send media data, such as audio video (AV) data, to one or more of the sink devices participating in a particular media share session. The media data may be played back at both a local display of the source device and at each of the displays of the sink devices. More specifically, each of the participating sink devices may render the received media data for presentation on its screen and audio equipment. In some cases, a user of a sink device may apply user inputs to the sink device, such as touch inputs and remote control inputs.

The Wi-Fi Display (WFD) standard (also known as Miracast™) is an emerging standard for wireless display systems being developed by the Wi-Fi Alliance and based on Wi-Fi Direct. The WFD standard provides an interoperable mechanism to discover, pair, connect and render media data sourced from a Wi-Fi Display Source at a Wi-Fi Display Sink.

SUMMARY

In general, this disclosure describes techniques for incorporating wireless display functionality into existing control and display channels established and executed, according to a device interoperability standard, between a source device and a sink device. In some examples, functionality described in the Wi-Fi Display (WFD) standard specification may be incorporated into a MirrorLink™ session using techniques described herein. In such examples a smartphone or other source device and a vehicle head unit or other sink device establish a layer two (L2) communication session using one or more of the L2 communication protocols utilized by MirrorLink™ Upon establishing the L2 communication session, the source device performs addressing and discovery steps to discover the vehicle head unit according to the MirrorLink™ interoperability standard and to establish a control channel capable of transporting commands between the consumer electronics device and the vehicle head unit. For example, the control channel may transport voice or other user interface commands received by an input device of the vehicle head unit.

Subsequently, the vehicle head unit can use the control channel to transport a command to the source device to direct the source device to execute a WFD service to source media data for transport to the vehicle head unit. The vehicle head unit and the source device may establish a Wi-Fi Display session to enable to the source device to operate as a WFD source device in accordance with the WFD specification and thereby source media data to the vehicle head unit operating as a sink device in accordance with the WFD specification. In this way, a WFD session can at least temporarily supplant a MirrorLink™ communication session, and the WFD session can assume control of interactions between the source device and the vehicle head unit and transports control messages and data between the source device and the vehicle head unit. In some instances, however, the vehicle head unit requests the source device to move to a different communication channel for the WFD session. While described primarily with respect to a vehicle head unit, the techniques of this disclosure may be applicable to other types of sink devices for a wireless display protocol that also execute a MirrorLink™ implementation.

In some examples, the vehicle head unit displays a user selection window that presents one or more applications for execution. Some or all of the applications may be associated with WFD, and when a user of the vehicle head unit selects one of the applications associated with WFD, the selected application invokes the WFD protocol to establish the WFD session to transport data issued by the selected application and to receive User Interface Back Channel (UIBC) commands from the vehicle head unit that direct the operation of the selected application.

The techniques of this disclosure may provide one or more advantages. For example, the integrated functionality may provide a secure, reliable, and a control and improved-bandwidth display channel using wireless transport. As another example, the incorporated functionality may provide wider range of services than that provided by the existing control and display channel operating according to MirrorLink™ Although diverting output from the source device to the vehicle head unit, the techniques may also enable controlling the source device through the vehicle head unit may be the main interactions. Consequently, as soon as user of the source device enters the vehicle having the vehicle head unit, the output of media data and controls hosted by the source device are effectively transferred, at least in part, to the vehicle head unit in a seamless manner, thus making interaction safer and richer.

In one example, a method of transmitting media data from a source device comprises establishing, with the source device, a first communication session between the source device and a sink device comprising a vehicle head unit, wherein the first communication session conforms to a communication protocol. The method also comprises discovering, with the source device and by the first communication session, the sink device. The method further comprises, during operation of the first communication session, establishing with the source device a second communication session between the source device and the sink device, wherein the second communication session conforms to a wireless display protocol. The method also comprises transmitting, using the second communication session, media data from the source device to the sink device for output to an interface of the sink device.

In another example, a method of receiving media data with a sink device comprising a vehicle head unit comprises establishing, with the sink device, a first communication session between the sink device and a source device, wherein the first communication session conforms to a communication protocol. The method also comprises discovering, with the sink device and by the first communication session, the source device. The method further comprises, during operation of the first communication session, establishing with the sink device a second communication session between the source device and the sink device, wherein the second communication session conforms to a wireless display protocol. The method also comprises receiving, with the sink device using the second communication session, media data from the source device. The method further comprises rendering the media data to an interface of the sink device.

In another example, a source device comprises a MirrorLink interface configured to establish a first communication session with a sink device comprising a vehicle head unit, wherein the first communication session conforms to a communication protocol, wherein the MirrorLink interface is configured to discover, by the first communication session, a sink device. The source device also comprises a Wi-Fi Display (WFD) source configured to, during operation of the first communication session, establish a second communication session with the sink device, wherein the second communication session conforms to a wireless display protocol, and wherein the WFD source is configured to transmit, using the second communication session, media data to the sink device for output to an interface of the sink device.

In another example, a sink device comprises a MirrorLink interface configured to establish a first communication session with a source device, wherein the first communication session conforms to a communication protocol, wherein the MirrorLink interface is configured to discover, by the first communication session, the source device. The sink device also comprises a Wi-Fi Display (WFD) sink configured to, during operation of the first communication session, establish a second communication session with the sink device, wherein the second communication session conforms to a wireless display protocol, wherein the WFD sink is configured to receive, using the second communication session, media data from the source device, and wherein the WFD sink is configured to render the media data to an interface of the sink device.

In another example, a source device comprises means for establishing a first communication session with a sink device comprising a vehicle head unit, wherein the first communication session conforms to a communication protocol. The source device also includes means for discovering, by the first communication session, the sink device. The source device further comprises means for, during operation of the first communication session, establishing a second communication session with the sink device, wherein the second communication session conforms to a wireless display protocol. The source device also comprises means for transmitting, using the second communication session, media data to the sink device for output to an interface of the sink device.

In another example, a sink device comprises means for establishing a first communication session with a source device, wherein the first communication session conforms to a communication protocol. The sink device also comprises means for discovering, by the first communication session, the source device. The sink device further comprises means for, during operation of the first communication session, establishing a second communication session with the source device, wherein the second communication session conforms to a wireless display protocol. The sink device also comprises means for receiving, using the second communication session, media data from the source device. The sink device further comprises means for rendering the media data to an interface.

In another example, a computer-readable storage medium including instructions stored thereon that when executed cause one or more processors to establish, with the source device, a first communication session between a source device and a sink device comprising a vehicle head unit, wherein the first communication session conforms to a communication protocol. The instructions also cause the processors to discover, with the source device and by the first communication session, the sink device. The instructions further cause the processors to, during operation of the first communication session, establish with the source device a second communication session between the source device and the sink device, wherein the second communication session conforms to a wireless display protocol. The instructions also cause the processors to transmit, using the second communication session, media data from the source device to the sink device for output to an interface of the sink device.

In another example, a computer-readable storage medium including instructions stored thereon that when executed cause one or more processors to establish, with the sink device, a first communication session between a sink device comprising a vehicle head unit and a source device, wherein the first communication session conforms to a communication protocol. The instructions also cause the processors to discover, with the sink device and by the first communication session, the source device. The instructions further cause the processors to, during operation of the first communication session, establish with the sink device a second communication session between the source device and the sink device, wherein the second communication session conforms to a wireless display protocol. The instructions also cause the processors to receive, with the sink device using the second communication session, media data from the source device. The instructions further cause the processors to render the media data to an interface of the sink device.

The details of one or more examples of the disclosure are set forth in the accompanying drawings and the description below. Other features, objects, and advantages will be apparent from the description and drawings, and from the claims.

DETAILED DESCRIPTION

Figure 1:
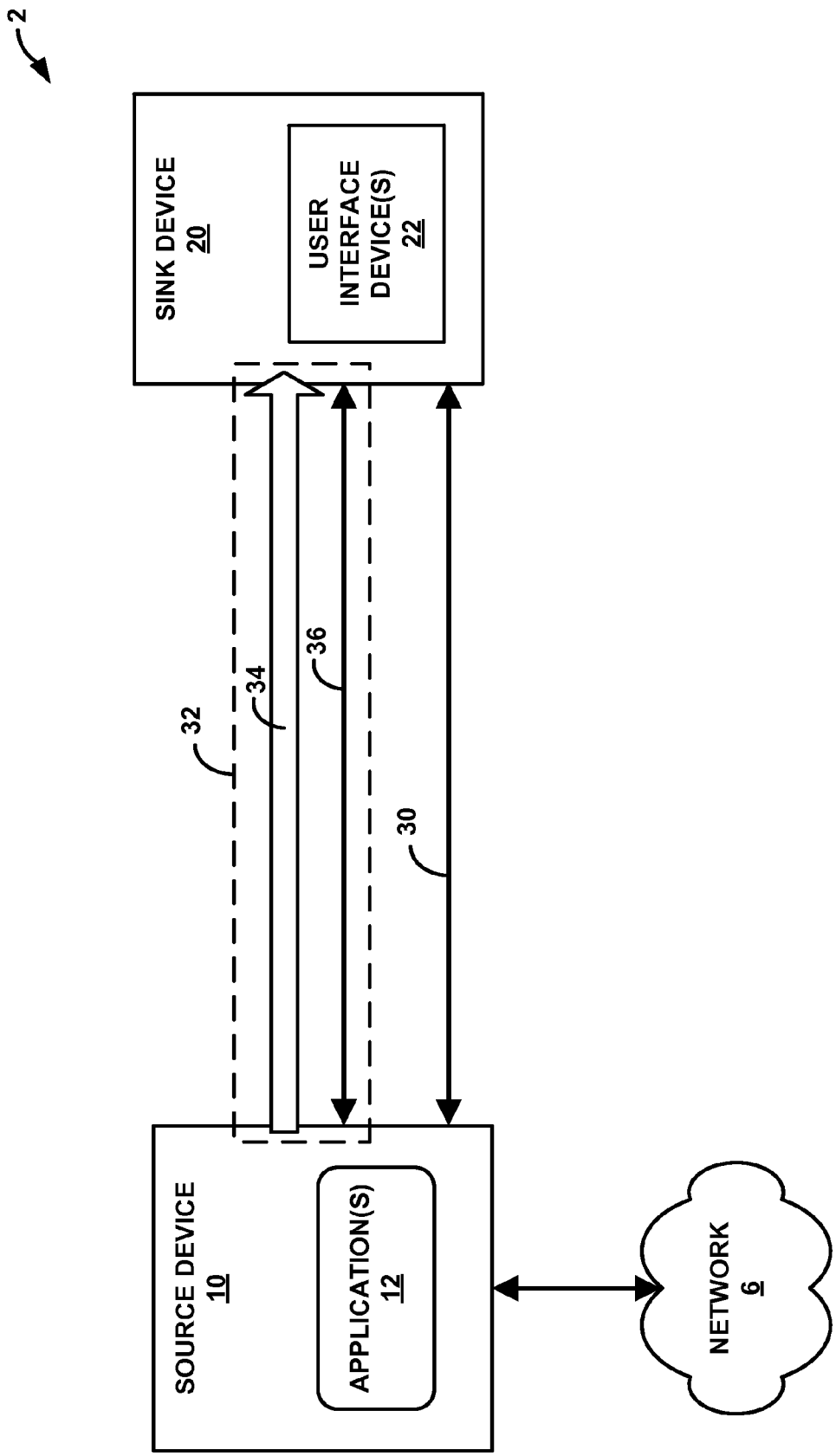
FIG. 1 is a block diagram illustrating an example of a wireless communication system operating according to techniques described herein.

MirrorLink™ is a device interoperability standard developed by the Car Connectivity Consortium. MirrorLink™ may also be referred to as Terminal Mode and is described in the MirrorLink™ 1.0 Device Specification. One goal of MirrorLink™ is to offer safe and seamless integration between a smartphone and a car's infotainment system. MirrorLink™ may transform smartphones into automotive application platforms where apps are hosted and run on the smartphone while drivers and passengers interact with the apps through steering wheel controls, dashboard buttons, and/or touch screens of the car's In-Vehicle Infotainment (IVI) system. MirrorLink™ utilizes a set of well-established, non-proprietary technologies such as IP, USB, Wi-Fi, Bluetooth, Real-Time Protocol (RTP, for audio) and Universal Plug and Play (UPnP). In addition, MirrorLink™ uses Virtual Network Computing (VNC) as the baseline protocol to display the user interface of the smartphone applications on IVI screens and to communicate user input back to the smartphone.

According to techniques of this disclosure, aspects of a wireless display protocol are incorporated into MirrorLink™ to expand the range of available services between a wireless display sink device and wireless display source device, such as between vehicle head unit and a smartphone or other consumer electronics device. For example, aspects of Wi-Fi Display (WFD) functionality may be incorporated into MirrorLink™, and a smartphone may use the incorporated functionality to wirelessly divert output to a vehicle head unit in a seamless manner while permitting a driver of the vehicle to control the smartphone through the vehicle head unit to control the outlet. In other examples, the techniques may include integrating functionality drawn from WirelessHD, Wireless Home Digital Interface (WHDI), WiGig, or Wireless Universal Serial Bus (USB).

As another example, the techniques may include incorporating aspects of a wireless display protocol into MirrorLink™ in systems in which the vehicle head unit does not support Wi-Fi Display and in systems in which the sink device supports Wi-Fi Display. In systems in which the sink device does not support Wi-Fi Display, the techniques may include incorporating a reduced set of services into MirrorLink™ in contradistinction to systems in which the sink device supports Wi-Fi Display. For instance, the reduced set of services may not include a reverse channel architecture that allow for controlling source device applications.

As a further example, the techniques may include incorporating aspects of a wireless display protocol into MirrorLink™ implementations that support Peer-to-Peer (P2P) group formation and into MirrorLink™ implementations that do not support P2P group formation. For MirrorLink™ implementations that do not support P2P group formation, the wireless display protocol performs P2P group formation to establish a P2P group for the sink device and source device, which may require running a security association step for both the initial MirrorLink™ session and separately for the wireless display protocol session setup.

As another example, the techniques may include differentiating among multiple vehicle consoles, such as the front console (or vehicle head unit) and rear console (rear passenger unit) of an automobile, to adjust wireless display applications to the unique requirements of the front and rear console. For example, because a front console is accessible to the driver of an automobile, the techniques may limit some applications to the front console for situations in which the automobile is in motion while refraining from applying such limits to the rear console. As another example, a source device may adaptively change the console destination according to a type of streaming media data. For instance, if streaming media data to the sink device is audio only, the source device may direct the media data to the front console, which routes the audio through the automobile speaker system. If, on the other hand, streaming media data to the sink device includes video data, the source device may direct the video to the rear console while the automobile is in motion or, when the automobile is not in motion, to the front console for replication and routing to the front and rear console displays through the automobile system.

As a further example, the techniques may include performing non-MirrorLink™ standard discovery protocols to discover devices in a MirrorLink™ system. MirrorLink™ specifies the use of Universal Plug and Play (UPnP) for device discovery. The techniques may include using additional discovery protocols, such as Wi-Fi Direct or Bluetooth, to identify wireless display protocol-supporting devices within range and to receive service descriptions for such devices. A wireless display protocol session may then supplant discovery protocol session and assume control of interactions between the source device and the sink device and transports control messages and data between the source device and the sink device.

FIG. 1 is a block diagram illustrating an example of a wireless communication system operating according to techniques described herein. Wireless communication system 2 includes source device 10 executing one or more applications 12. Source device 10 may represent a mobile computing device, including but not limited to a mobile phone, a tablet computer, a personal digital assistant, a handheld computer, a media player, and the like, or a combination of two or more of these items. Source device 10 communicates with network 6 by a wireless communication link to, e.g., receive media data, from a server accessible by network 6. In some aspect, source device 10 may additionally, or alternatively, represent a standalone source device that sources media data from computer-readable storage media of the source device (not shown in FIG. 1).

Network 6 may represent a mobile network operated by a service provider to 4 to provide network access, data transport and other services to source device 10. In general, network 6 may implement a cellular network architecture, such as a General Packet Radio Service (GPRS) architecture, a Universal Mobile Telecommunications System (UMTS) architecture, and an evolution of UMTS referred to as Long Term Evolution (LTE), each of which are standardized by 3rd Generation Partnership Project (3GPP).

Each of applications 12 may represent an application provided by an entity that manufactures source device 10 or software operating on source device 10 or an application developed by a third-party for use with source device 10. Examples of applications 12 include applications for travel routing, maps, audio and/or video presentation, streaming video delivery and presentation, voice and/or calls, weather, etc. Each of applications 12 may conform to the MirrorLink™ device interoperability standard developed by the Car Connectivity Consortium (CCC) and may offer integration with sink device 20 using MirrorLink™. A conforming one of applications 12 may alternatively be referred to herein as a "CCC application." Source device 10 may include additional applications that do not conform to MirrorLink™.

Sink device 20 may in some instances represent a vehicle head unit for an automobile that executes a MirrorLink™ implementation capable of integrating one or more user interface devices 22 of sink device 20 with source device 10. User interface devices 22 may include one or more input devices configured to receive input from a user through tactile, audio, or video feedback. Examples of input devices include a presence- and/or touch-sensitive display, a mouse, a keyboard, a voice responsive system, video camera, microphone, steering wheel button or knobs or other controls in the vehicle that can be pushed or rotated for, e.g., volume increase or decrease, or any other type of device for detecting a command from a user. Reference herein to a "user" of sink device 20 and/or source device 10 may include a driver or passenger of an automobile that includes sink device 20. User interface devices 22 may also include one or more output devices configured to provide output to a user using tactile, audio, or video stimuli. Examples of output devices include a presence-sensitive display, a sound card, a speaker, a video graphics adapter card, a speaker, a liquid crystal display (LCD), or any other type of device for converting a signal into an appropriate form understandable to humans or machines.

Source device 10 and sink device 20 may establish a layer two (L2) communication session 30 according to one or more communication protocols utilized in MirrorLink™ implementations, for example, Universal Serial Bus (USB) 2.0, Wireless Local Area Network (WLAN), Bluetooth, and/or Advanced Audio Distribution Profile (A2DP). Source device 10 and sink device 20 may use Bluetooth and/or A2DP for audio input/output (I/O) through the Hands Free Profile, while using one of USB 2.0 or WLAN to transport other types of application data such as video, text, and application interfaces. WLAN may conform to a wireless communication standard from the IEEE 802.11 family of standards. Layer two communication session 30 may operate over a wired or wireless transport medium. For example, a vehicle driver may plug source device 10 into a USB 2.0-compatible cable or docking interface provided by (or connected to) a vehicle head unit that includes sink device 20 to transport L2 communication session 30 signals. Alternatively, source device 10 and sink device 20 may operate MirrorLink™ communication session 30 wirelessly according to, e.g., a WLAN protocol such as Wi-Fi.

According to techniques described herein, source device 10 and sink device 20 can use L2 communication session 30 to establish wireless display (WD) protocol session 32 to enable sink device 20 to operate as a WD sink and enable source device 10 to operate as a WD source to source media data 34 to sink device 20. In addition, WD protocol session 32 may include WD control channel 36 to, e.g., allow sink device 20 to send user inputs received at user interface devices 22 to source device 10 to control the delivery of media data to sink device 20. In some instances, L2 communication session 30 may operate over a wired link, while WD protocol session 32 may operate over a wireless link in accordance with the corresponding wireless display protocol.

Wireless display protocol session 32 may represent a Wi-Fi Display (WFD) session that communicates according to the Wi-Fi Direct (WFD) standard, such that source device 10 and sink device 20 communicate directly with one another without the use of an intermediary such as wireless access points or so called hotspots. Source device 10 and sink device 20 may also establish a tunneled direct link setup (TDLS) to avoid or reduce network congestion. In general, WFD and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters, less than approximately 15 meters or generally within the interior of a vehicle such as an automobile.

The techniques of this disclosure may at times be described with respect to WFD, but it is contemplated that aspects of these techniques may also be compatible with other communication protocols. By way of example and not limitation, the wireless communication between source device 10 and sink device 20 may utilize orthogonal frequency division multiplexing (OFDM) techniques. A wide variety of other wireless communication techniques may also be used, including but not limited to time division multi access (TDMA), frequency division multi access (FDMA), code division multi-access (CDMA), or any combination of OFDM, FDMA, TDMA and/or CDMA. However, WFD may provide a wider range of services than other wireless display protocols in accordance with techniques of this disclosure.

As mentioned above, in addition to outputting data received from source device 10, sink device 20 can also receive user inputs from user input devices 22 and format user input commands into a data packet structure that source device 10 is capable of interpreting. Sink device 20 transmitted formatted input commands to source device 10 using WD control channel 36. Based on commands received, source device 10 can modify the media data being transmitted to sink device 20. In this manner, a user of sink device 20 can control the audio payload data and video payload data being transmitted by source device 10 remotely and without directly interacting with source device 10.

In some examples, WD control channel 36 implements a reverse channel architecture, also referred to as a user interface back channel (UIBC), to enable sink device 20 to transmit the user inputs applied at sink device 20 to source device 10. The reverse channel architecture may include upper layer messages for transporting user inputs, and lower layer frames for negotiating user interface capabilities at sink device 20 and source device 10. The UIBC may operate over the transport layer between sink device 20 and source device 10 in the Transmission Control Protocol (TCP)/Internet Protocol (IP) or User Datagram Protocol (UDP)/IP models.

By using L2 communication session 30 to bootstrap wireless display protocol session 32, the techniques may provide seamless transfer of WD application output and control from source device 10 to sink device 20, thus making interaction with source device 10 safer and richer in instances in the automotive applications, i.e., in embodiments in which source device 10 includes a vehicle head unit. In addition, wireless display protocol session 32 may introduce not only improved security, reliability, and speed vis-à-vis L2 communication session 30 but also, in some examples, WD control channel 36 that facilitates communication of user inputs to source device 10.

Figure 2:
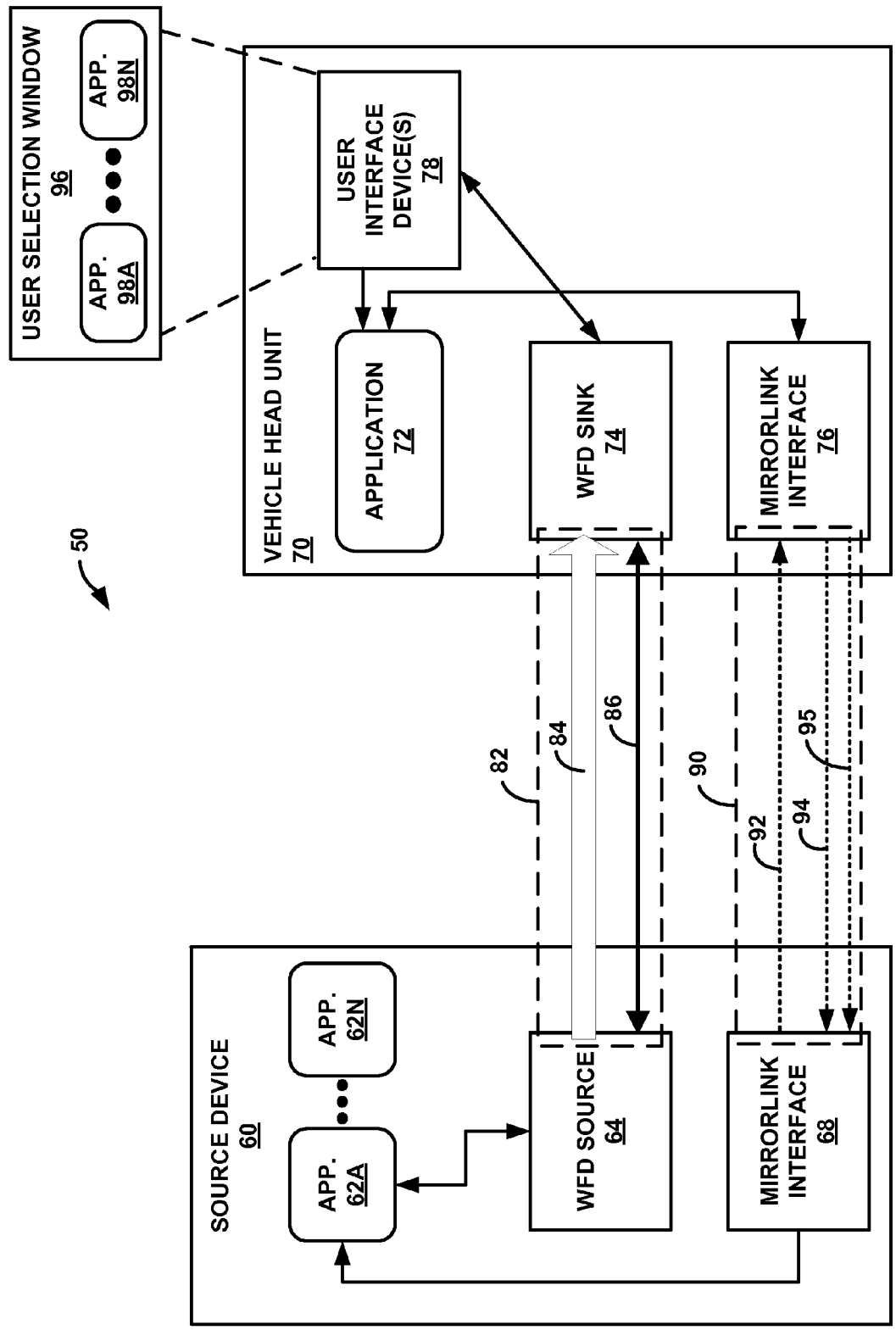
FIG. 2 is a block diagram illustrating an example of a wireless communication system operating according to techniques described herein.

FIG. 2 is a block diagram illustrating an example of a wireless communication system operating according to techniques described herein. Wireless communication system 50 includes source device 60 and vehicle head unit 70 that may represent example instances of source device 10 and sink device 20, respectively, of FIG. 1. Source device 60 includes applications 62A-62N (collectively, "applications 620", which may each represent an example instance of one of applications 12 of FIG. 1, as well as Wi-Fi Display source module 64 ("WFD source 64") and MirrorLink™ interface 68 ("MirrorLink interface 68"). Examples of applications 62 may include a mapping service, a video or audio streaming service, a video or audio player, a telephone service, a personal organization service, etc.

Vehicle head unit 70 includes one or more user interface devices 78, which may represent instances of user interface device 12 of FIG. 1, as well as application 72, wireless display sink 74 ("WFD sink 74"), and MirrorLink™ interface 76 ("MirrorLink interface 76"). Application 72 may represent a browser or other display application by which MirrorLink™ interface 76 may display media data, e.g., web pages, received in MirrorLink™ session 90.

MirrorLink™ interface 68 and MirrorLink™ interface 76 may establish MirrorLink™ session 90 between source device 60 and vehicle head unit 70 using the one or more protocols utilized according to the MirrorLink™ specification. In accordance with techniques described herein, MirrorLink™ interface 68 may use Universal Plug and Play (UPnP) to send, by MirrorLink™ session 90, a page message 92 for a page associated with a Uniform Resource Locator (URL) to MirrorLink™ interface 76 for display. The page included within page message 92 may render as a user interface, in this case user selection window 96. MirrorLink™ interface 76 may receive and present the page included in page message 92 for rendering by application 72 as user selection window 92 to a display device of user interface devices 78. In some examples, vehicle head unit 70 may store a representation of user selection window 94 and render user selection window 94 independently of MirrorLink™ session 90.

User selection window 96 lists wireless display applications icons 98A-98N (collectively, "application icons 98") available from source device 60 and corresponding to applications 62A-62N. A user of vehicle head unit 70, e.g., the vehicle driver, may select one of application icons 98, for example application icon 98A, by touching the application icon as presented to a touch-screen device of user interface devices 78 for instance or by selecting the icon using one or more selection buttons or other user input devices. In some instances, a user may select one of application icons 98 using a voice command associated with the application icon.

In response to selection of application icon 98A, application 72 receives an indication of the selection and directs MirrorLink™ interface 76 to send a start application service message 94 by MirrorLink™ session 90. Start application service message 94 may include an identifier for application 62A represented by application icon 98A. Start application service message 94 may be sent to a control URL for source device 60 in accordance with UPnP and may be expressed in eXtensible Markup Language (XML) using Simple Object Access Protocol (SOAP).

MirrorLink™ interface 68 receives start application service message 94 and, in response, executes application 62A to start a wireless display service represented by WFD source 64. Although illustrated as separate components, WFD source 64 may represent a service provided by application 62A. As described in further detail below, WFD source 64 and WFD sink 74 negotiate channel parameters for a WFD session 82. WFD source 64 directs media data 84 to WFD sink 74 for output to one or more of user interface devices 78. WFD control channel 86 may represent an example instance of WD control channel 36 of FIG. 1 and enables WFD sink 74 to transmit user inputs applied at user interface devices 78 to WFD source 64 to control application 62A and, more particularly, to modify the delivery of media data 84.

Figure 3:
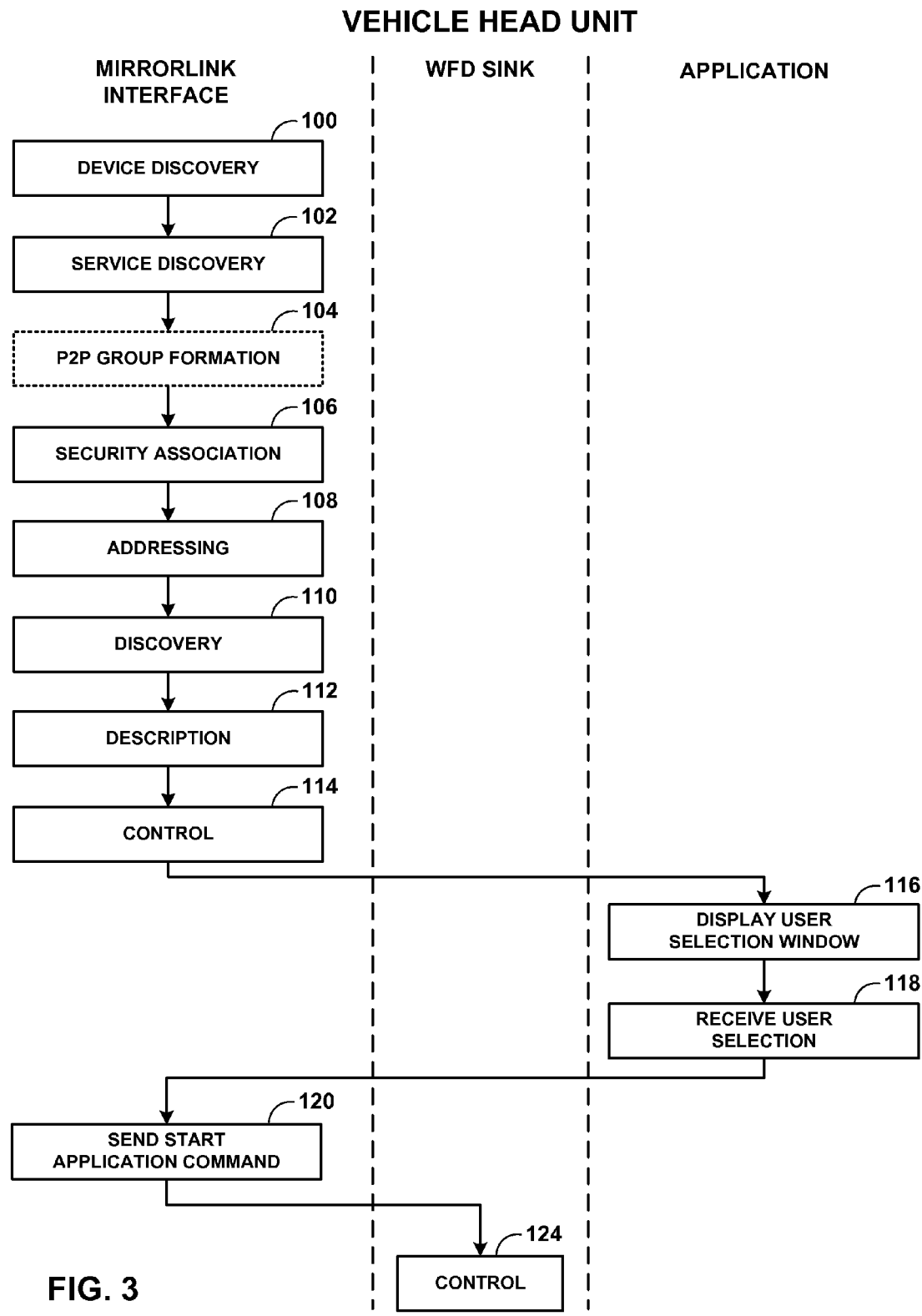
FIG. 3 is a flowchart illustrating an example operation of components of a vehicle head unit to establish a Wi-Fi Display session according to techniques described herein.

FIG. 3 is a flowchart illustrating an example operation of components of a vehicle head unit to establish a Wi-Fi Display session according to techniques described herein. The example operation is described with respect to vehicle head unit 70 of FIG. 2. Initially, MirrorLink™ interface 68 executes one or more layer two (L2) protocols associated with MirrorLink™, such as USB 2.0 or WLAN, to discover an accessible L2 device (100), discover services provided by the discovered device (102), optionally establish a peer-to-peer P2P group with the discovered device (104), and perform a security association with the discovered device to authenticate the device and to facilitate secure data exchange between the devices (106). MirrorLink™ may establish a P2P group using Wi-Fi Direct and/or TDLS. P2P group formation (104) is illustrated with dashed lines to indicate that MirrorLink™ interface 68 may not, in some examples, be configured to perform P2P group formation, as described in more detail with respect to FIGS. 4-5. Upon completing the security association (106), vehicle head unit 70 has established an L2 communication link usable to source and receive L2 packet data units (PDUs) with, e.g., source device 60.

A L2 communication link being established, MirrorLink™ interface 68 executes UPnP, in this example, to obtain a network layer, e.g., IP address (108). MirrorLink™ interface 68 may auto-assign vehicle head unit 70 an IP address. MirrorLink™ interface 68 additionally discovers devices available in the P2P group using, e.g., Simple Service Discovery Protocol (SSDP), or another service discover protocol (110). For a discovered device, MirrorLink™ interface 68 performs service discovery to identify services available from the devices as well as, in the case of UPnP, URLs for control, eventing, and presentation (112). MirrorLink™ interface 68 may then send/receive control messages in accordance with UPnP. In accordance with techniques described herein, application 72 displays a user selection window 96 providing selectable application icons 98 (116).

Upon a user selecting application icon 98A, application 72 directs MirrorLink™ interface 68 to send, using UPnP control, a start application service message 94 by MirrorLink™ session 90 (120). Start application service message 94 directs source device 60 to start the selected application 62A corresponding to application icon 98A. Selected application 62A, in turn, starts a WFD source 64 as service of source device 60. WFD sink 74 establishes WFD session 82 to supplant MirrorLink™ session 90 as the control channel 124 between source device 60 and vehicle head unit 70 while application 62A is active (124).

In some instances, MirrorLink™ interface 68 sends start application service message 94 unprompted by application 72 and prior to displaying a user selection window. For example, start application service message 94 may direct source device 60 to execute an application that invokes Wi-Fi Display protocols to transfer media data rendered to user interface devices 78 by Wi-Fi sink 74 as user selection window 96. A user may select one of application icons 98 to use invoke another of applications 62 executing on source device 60. As a result, Wi-Fi Display protocol provides earlier control for the session.

Figure 4:
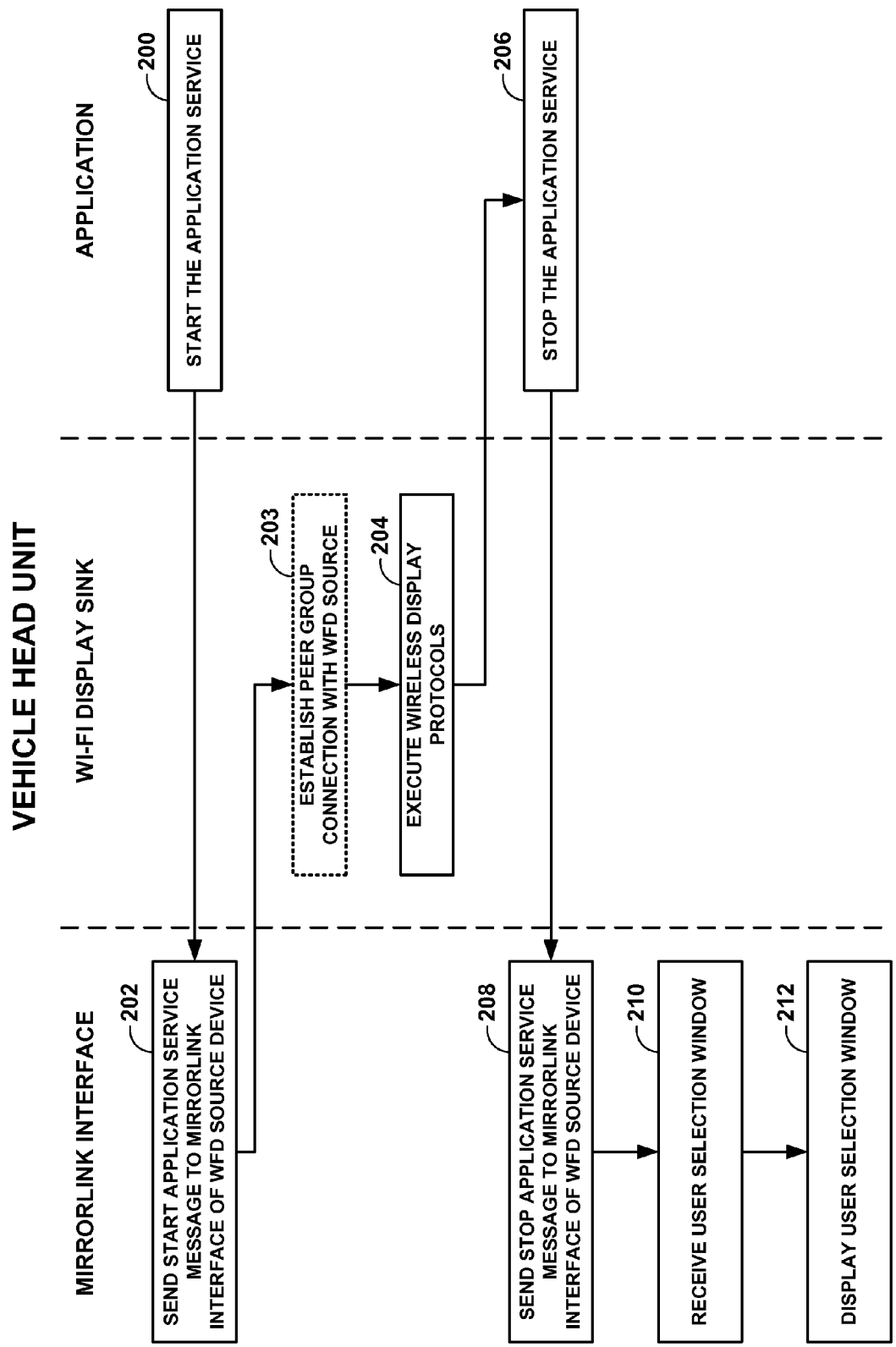
FIG. 4 is a flowchart illustrating an example operation of components of a vehicle head unit to establish a Wi-Fi Display session according to techniques described herein.

FIG. 4 is a flowchart illustrating an example operation of components of a vehicle head unit to establish a Wi-Fi Display session according to techniques described herein. The example operation is described with respect to vehicle head unit 70 of FIG. 2. Application 72, if necessary, starts a Wi-Fi Display service represented by WFD sink 74 and directs MirrorLink™ interface 76 to send a start application service message 94 to a peer (200). MirrorLink™ interface 76, in response, sends start application service message 94 to MirrorLink™ interface 68 of source device 10 (202). Start application service message 94 causes MirrorLink™ interface 68 to execute application 62A, which invokes WFD source 64. Subsequently, WFD sink 74 may optionally establish a peer group connection with WFD source 64 (203). Establishing a peer group connection is illustrated with dashed lines to indicate that this is an optional step predicated on whether MirrorLink™ interface 76 is capable of, and has previously established, a P2P group between source device 60 and vehicle head unit 70. If not, WFD sink 74 may perform P2P group formation using Wi-Fi Direct and/or TDLS. This may result in duplicate performance of a security association step between source device 60 and vehicle head unit 70, i.e., a first security association step for MirrorLink™ session 90 and a second security association step for WFD session 82.

WFD sink 74 may then execute WFD protocols to continue establishing and to carry out WFD session 82 (204). For example, WFD sink 74 and WFD source 64 may establish a communication session according to a capability negotiation using, for example, Real-Time Streaming Protocol (RTSP) control messages. In some examples, a request to establish a WFD session may be sent by source device 60 to vehicle head unit 70. Once the WFD session 82 is established, WFD sink 74 receives media data 84, e.g., audio video (AV) data, using Real-time Transport protocol (RTP) (another WFD protocol). WFD sink 74 renders and/or outputs the received media data to user interface devices 78.

Further, additional changes that may be made to the WFD Standard in order to support MirrorLink™, and these additional changes may include an extension of the capability negotiation in the WFD Standard to include additional parameters. As noted above, WFD sink 74 and WFD source 64 may negotiate capabilities using Real-Time Streaming Protocol (RTSP) control messages. According to the WFD Standard, a source device sends an acknowledgement request message (e.g., RTSP SET_PARAMETER request message) to a sink device. The RTSP SET_PARAMETER request message includes parameters indicating how information will be transmitted using the feedback channel during a media share session. In one example, the RTSP SET_PARAMETER request message may be modified to include a parameter for a UDP transport channel (port) for the feedback channel. The UDP transport channel may replace or complement the existing TCP transport channel. In one example, the RTSP SET_PARAMETER request message may include a parameter to indicate a User Datagram Protocol (UDP) port for WFD sink 74 to transmit UDP datagrams that include, e.g., voice commands for the UIBC. In one example, the SET_PARAMETER request message may be formatted according to the following syntax, where udp-port indicates the port on which the WFD source 64 requests to receive UDP datagrams:

| | |
|---|---|
| wfd-uibc-capability | = "wfd_uibc_capability:" SP ("none" / (input-category-val ";" generic-cap-val ";" hidc-cap-val ";" tcp-port)) CRLF; "none" if not supported |
| input-category-val | = "input_category_list=" ("none" / input-category-list) |
| input-category-list | = input-cat * ("," SP input-category-list) |
| input-cat | = "GENERIC" / "HIDC" |
| generic-cap-val | = "generic_cap_list=" ("none" / generic-cap-list) |
| generic-cap-list | = inp-type *("," SP generic-cap-list) |
| inp-type | = "Keyboard" / "Mouse" / "SingleTouch" / "MultiTouch" / "Joystick" / "Camera" / "Gesture" / "RemoteControl" |

-continued

| | |
|---|---|
| hidc-cap-val | = "hidc_cap_list=" ("none" / hidc-cap-list) |
| hidc-cap-list | = detailed-cap *("," SP hidc-cap-list) |
| detailed-cap | = inp-type "/" inp-path |
| inp-path | = "Infrared" / "USB" / "BT" / "Zigbee" / "Wi =-Fi" / "No-SP" |
| tcp-port | = "port=" ("none" / IPPORT) |
| udp-port | = "udp port=" ("none" / IPPORT) |

Subsequently, application 72 may receive an indication of a user input to user interface devices 78 to stop the application service (206). Alternatively, application 72 may autonomously stop the application service or receive a directive from the vehicle to stop the application service, for instance. Accordingly, application 72 directs MirrorLink™ interface 76 to send a stop application service message 95 to MirrorLink™ Interface 68 (208). The stop application service message causes source device 60 to stop or pause the WFD service represented by WFD source 64, and control passes back to MirrorLink™ interface 68 and MirrorLink™ interface 76 operating MirrorLink™ session 90. MirrorLink™ interface 76 may thereafter receive page message 92 from MirrorLink™ interface 68 (210) and render user selection window 94 to a display device of user interface devices 78 (212).

Figure 5:
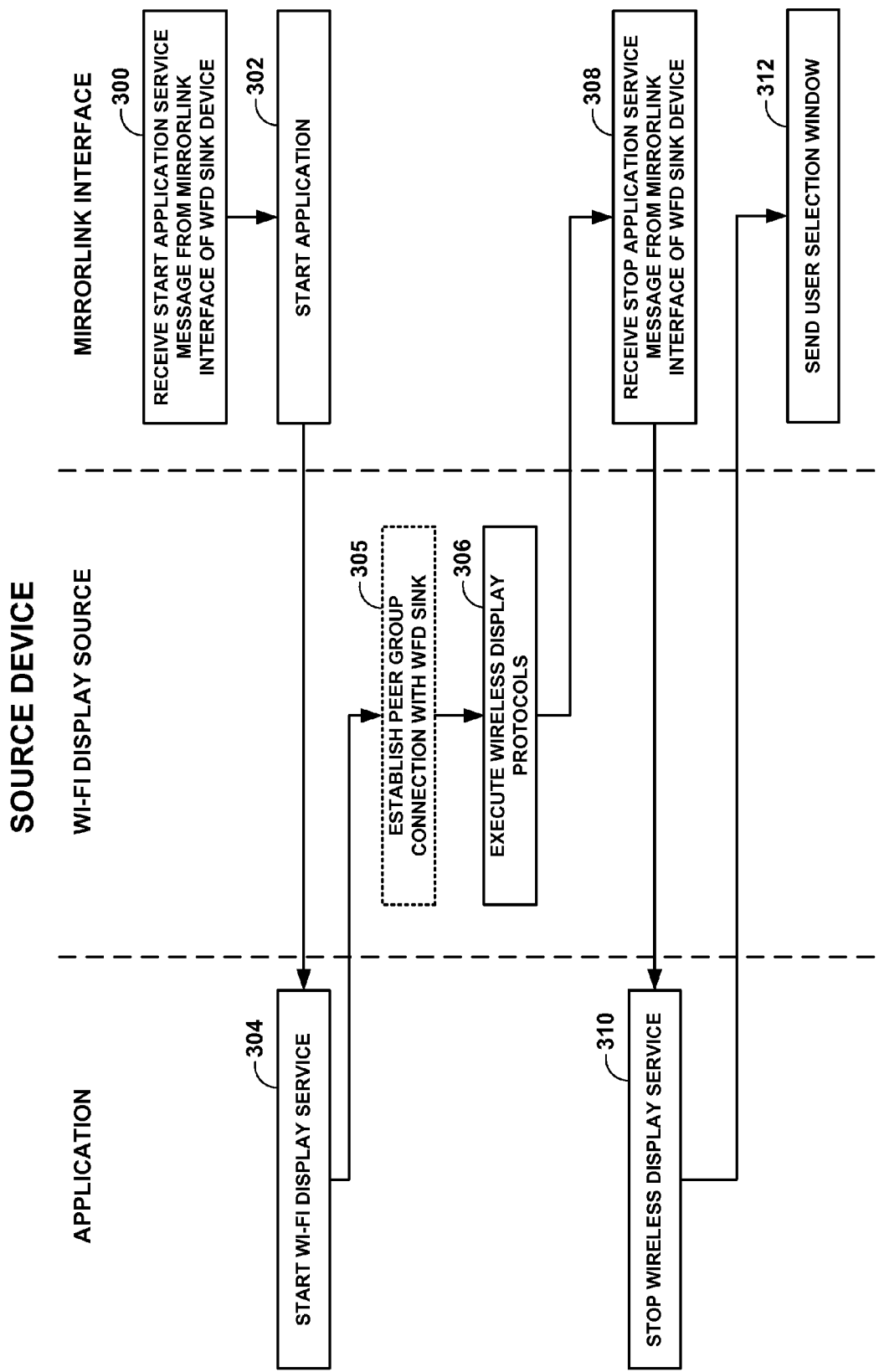
FIG. 5 is a flowchart illustrating an example operation of components of a vehicle head unit to establish a Wi-Fi Display session according to techniques described herein.

FIG. 5 is a flowchart illustrating an example operation of components of a vehicle head unit to establish a Wi-Fi Display session according to techniques described herein. The example operation is described with respect to source device 60 of FIG. 2. Initially, MirrorLink™ interface 68 receives a start application service message 94 from MirrorLink™ interface 76 (300), which causes MirrorLink™ interface 68 to start application 62A (302). Application 62A, in turn, starts a Wi-Fi Display service represented by WFD source 64 (304).

WFD source 64 may optionally establish a peer (P2P) group connection with WFD sink 72 (305). Establishing a peer group connection is illustrated with dashed lines to indicate that this is an optional step predicated on whether MirrorLink™ interface 68 is capable of, and has previously established, a P2P group between source device 60 and vehicle head unit 70. If not, WFD source 64 may perform P2P group formation using Wi-Fi Direct and/or TDLS. This may result in duplicate performance of a security association step between source device 60 and vehicle head unit 70, i.e., a first security association step for MirrorLink™ session 90 and a second security association step for WFD session 82. In some instances, WFD session 82 and MirrorLink™ session 90 may not use the same interface when the MirrorLink™ implementation does not support P2P group formation. In such instances, after establishing a peer group connection, WFD source 64 may request WFD sink 74 to use a different channel for WFD session 82.

WFD source 64 may then execute WFD protocols to continue establishing and to carry out WFD session 82 (306). For example, WFD sink 74 and WFD source 64 may establish a communication session according to a capability negotiation using, for example, Real-Time Streaming Protocol (RTSP) control messages. In some examples, WFD source 64 may send a request to establish a WFD session to vehicle head unit 70. Once the WFD session 82 is established, WFD source 64 sends media data 84, e.g., audio video (AV) data, using Real-time Transport protocol (RTP) (another WFD protocol). WFD source 64 may obtain media data from application 62A, which may load media data from a computer-readable storage medium of source device 60 (not shown) or receiving streaming media data from a network, such as network 6 of FIG. 1.

Subsequently, MirrorLink™ interface 68 may receive a stop application service message 95 from MirrorLink™ interface 76 (308). In response, MirrorLink™ interface 68 to stops or pauses the WFD service represented by WFD source 64 (310), and control passes back to MirrorLink™ interface 68 and MirrorLink™ interface 76 operating MirrorLink™ session 90. MirrorLink™ interface 68 may thereafter receive send page message 92 including user selection window 94 to MirrorLink™ interface 76 (314).

Figure 6:
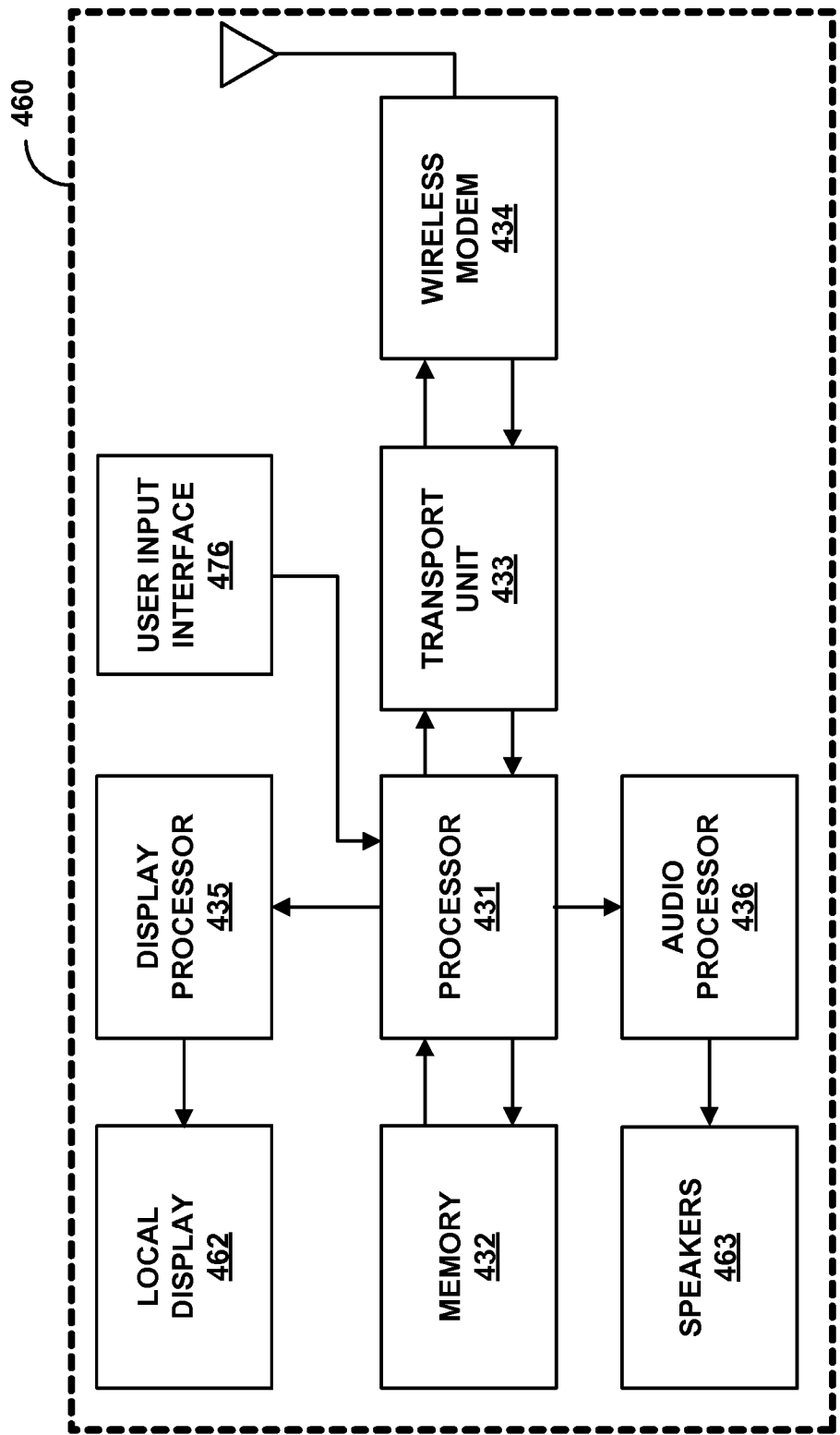
FIG. 6 is a block diagram illustrating an example of a computing system that may implement techniques of this disclosure.

FIG. 6 is a block diagram illustrating an example of a computing system that may implement techniques of this disclosure. Computing system 460 may include components similar to those of any of source device 10 and sink device 20 of FIG. 1 or source device 60 and vehicle head unit 70 of FIG. 2. Computing system 460 includes processor 431, memory 432, transport unit 433, wireless modem 434, display processor 435, local display 462, audio processor 436, speaker 463, and user input interface 476.

Wireless modem 434 exchanges encapsulated data units on a wireless link. Wireless modem 434 may, for example, be a Wi-Fi modem configured to implement one more standards from the IEEE 802.11 family of standards. Transport unit 433 can encapsulate data units for transmission and decapsulate received encapsulated data units. For instance, transport unit 433 may extract encoded audio/video (A/V) data from the encapsulated data units and send the encoded A/V data to processor 431 to be decoded and rendered for output. Display processor 435 may process decoded video data to be displayed on local display 462, and audio processor 436 may process decoded audio data for output on speaker 463. Local display 462 and speakers 463 may represent examples of user interface devices 22 of FIG. 1 and/or user interface devices 78 of FIG. 2. As another example, transport unit 433 may encapsulate encoded A/V data unit received from processor 431 for transmission by wireless modem 434 on the wireless link.

Computing device 460 may also receive user input data through user input interface 476, which may also represent an example of a user interface devices 22 or user interface devices 78. For instance, user input interface 476 can represent any of a number of user input devices included but not limited to a touch-sensitive or presence-sensitive display interface, a keyboard, a mouse, a voice command module, a gesture capture device (e.g., with camera-based input capturing capabilities) or another type of user input device. User input received through user input interface 476 can be processed by processor 431. In instances in which computing device 460 embodies a sink device, such as sink device 20 of FIG. 1, this processing may include generating data packets that include the received user input command. Once generated, transport unit 433 may process the data packets for network transport to a source device over a UIBC, for example. In some instances, computing device 460 may include, coupled to transport unit 433, an additional interface for a wired communication link, such as a USB port.

Processor 431 may include one or more of a wide range of processors, such as one or more digital signal processors (DSPs), general purpose microprocessors, application specific integrated circuits (ASICs), field programmable logic arrays (FPGAs), other equivalent integrated or discrete logic circuitry, or some combination thereof. Memory 432 of computing device 460 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 432 may comprise a computer-readable storage medium for storing audio/video data, as well as other kinds of data. Memory 432 may additionally store instructions and program code that are executed by processor 431 as part of performing the various techniques described in this disclosure.

The techniques of this disclosure include, in some instances, using a communication session established according to a MirrorLink™ implementation to transport a command to a Wi-Fi Display (WFD, also known as Miracast) source device to direct the source device to execute a WFD service to source media data for encapsulation by transport unit 433 for transport to a WFD sink device. The WFD sink device and the WFD source device establish a Wi-Fi Display session to enable to the source device to operate as a WFD source device in accordance with the WFD specification and thereby source media data to the vehicle head unit operating as a sink device in accordance with the WFD specification. In this way, a WFD session at least temporarily supplants the MirrorLink™ communication session, and the WFD session assumes control of interactions between the WFD source device and the WFD sink device and transports control messages and data between the WFD source device and the WFD sink device. The techniques are described in further detail with respect to FIGS. 1-5, for instance.

Figure 7:
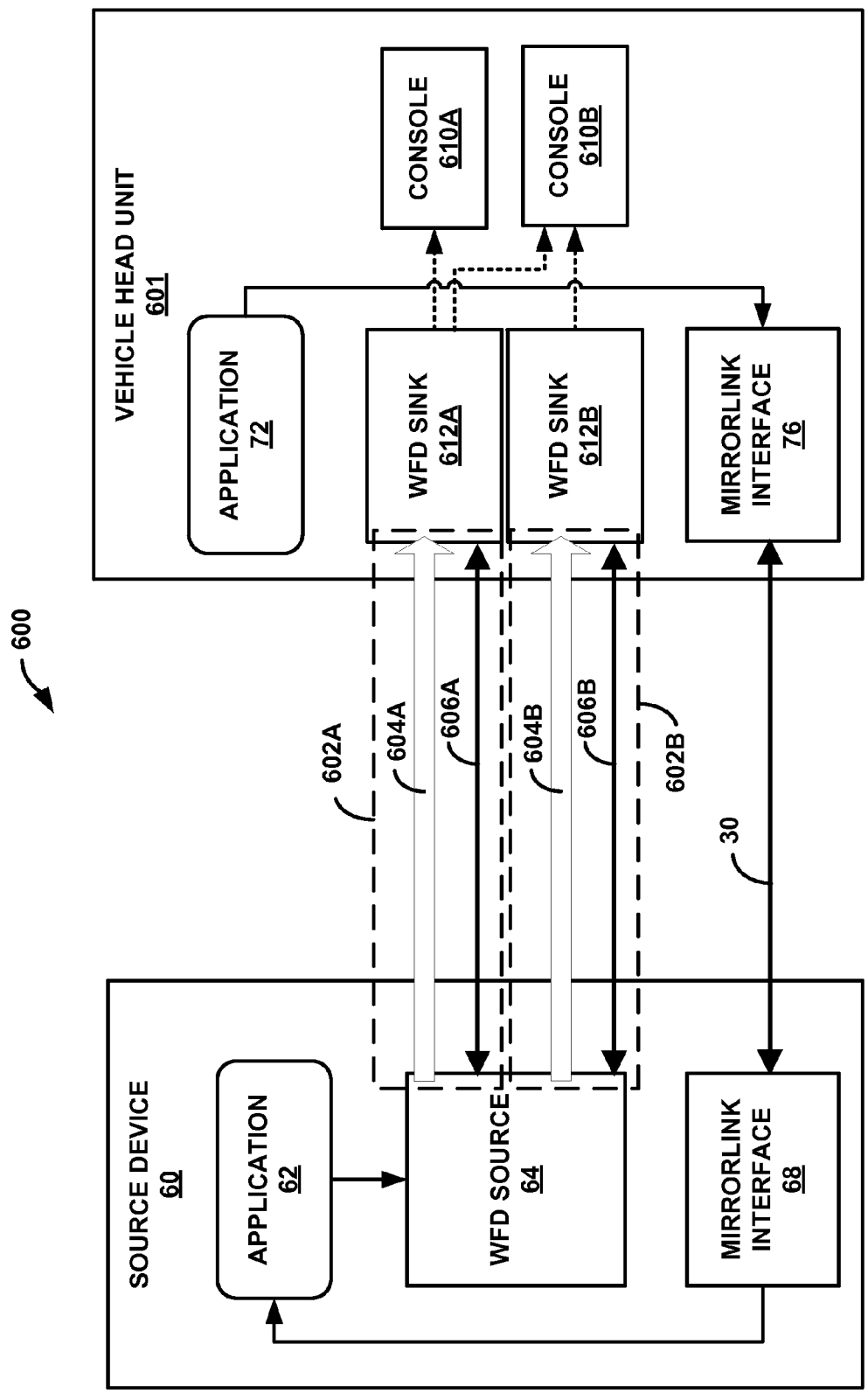
FIG. 7 is a block diagram illustrating an example instance of a wireless communication session that includes multiple wireless protocol sessions to support multiple vehicle consoles according to techniques described herein.

FIG. 7 is a block diagram illustrating an example instance of a wireless communication session that includes multiple wireless protocol sessions to support multiple vehicle consoles according to techniques described herein. Wireless communication system 600 may represent a wireless communication system 50 of FIG. 2 modified to support multiple vehicle consoles 80A-80B controlled by vehicle head unit 601, which may represent an instance of vehicle head unit 70 of FIG. 2.

In this example, vehicle head unit 70 includes vehicle consoles 610A-610B ("consoles 610A-610B") that may represent front and rear consoles for an automobile, respectively. Console 610B is accessible to rear seat passengers. Vehicle console 610B representing a rear console may be substantially inaccessible to the driver of the vehicle in that the interfaces, e.g., display and tactile user inputs, for console 610B are out of reach and/or not visible to the driver while seated in the driver's seat. By contrast, vehicle console 610A representing a front console may be accessible to the driver of the vehicle, even while the driver is driving and the vehicle is in motion.

WFD includes capabilities to support primary and secondary WFD sinks. Vehicle head unit 70 includes WFD sinks 612A-612B that may alternate as respective primary and secondary according to the type of application and whether the vehicle is in motion, for example. In general, according to the WFD specification, a primary sink is a WFD sink that is capable of rendering video data only or audio and video data. If capable of rendering audio and video data, it must also be capable of rendering audio data only and video data only. A secondary sink is a WFD sink that is capable of rendering audio data, including audio data received from a WFD source. In coupled sink operation, the source may redirect rendering audio data from a primary sink to a coupled secondary sink (and vice versa) when coupling is established between the primary and secondary sink. If both source and sink devices support coupled sink operation, then the source may send audio data to either the primary or secondary sink.

The techniques of this disclosure may also include selectively mapping WFD sinks 612A-612B as primary and secondary WFD sinks. WFD sink 612A outputs received media data to console 610A, while WFD sink 612B outputs received media data to console 612B. WFD sinks 612A-612B establish respective WFD sessions 602A-602B with WFD source 64 according to techniques described above, i.e., using MirrorLink™ session 30 established between MirrorLink™ interface 68 and MirrorLink™ interface 76. In some instances, each of WFD sessions 602A-602B is associated with a different session identifier in order to differentiate between WFD sinks 612A-612B for consoles 610A-612B. In some instances, however, vehicle head unit 601 includes a single WFD sink that establishes a single WFD session with WFD source 64. Different session identifiers may be used to differentiate media data destined for console 610A versus destined for console 610B.

Source device 60 may differentiate between various types of applications, e.g., instances of application 62. Some applications may be available to the driver and console 610A only when the vehicle is stopped. However, such applications may be available to rear passengers and directed to WFD sink 612B for console 610B.

In addition, based on media data being streamed, source device 60 may adaptively change the destination based on information received in control channels 606A-606B. For example, WFD sinks 612 may indicate to WFD source 64 that the vehicle is in motion. When an application 62 provides audio-only streaming data for WFD source 64, WFD source 64 may stream copies to both WFD sinks 612A-612B. Alternatively, WFD source 64 may stream a single copy to WFD sink 612A, which can route the audio streaming data to the front and rear speakers, in some instances associated with respective consoles 610A-610B. When an application 62 provides video streaming, WFD source 64 may selectively stream the video data only to WFD sink 612B for output to console 610B. If WFD source 64 subsequently receives an indication by control channels 606A-606B that the vehicle is stopped, WFD source 64 may stream the video data to WFD sink 612A for rendering to console 610A. WFD sink 612A may additionally render video to console 610B in some instances to avoid streaming multiple copies of the video.

In some examples, MirrorLink™ context information parameters may be modified to include additional information regarding a type of application 62. The additional information may characterize application 62 as, for example, a video application that provides video content as movies, natural video or synthetic (computer generated), Flash content, and so forth; a gaming application that may require additional touch feedback; a music application in which vehicle head unit 601 adjusts a user interface device to permit skipping, pause, and play options. The additional information may also direct WFD sinks 612 to present a display according to a prescribed window location and size for, e.g., an incoming call.

Figure 8:
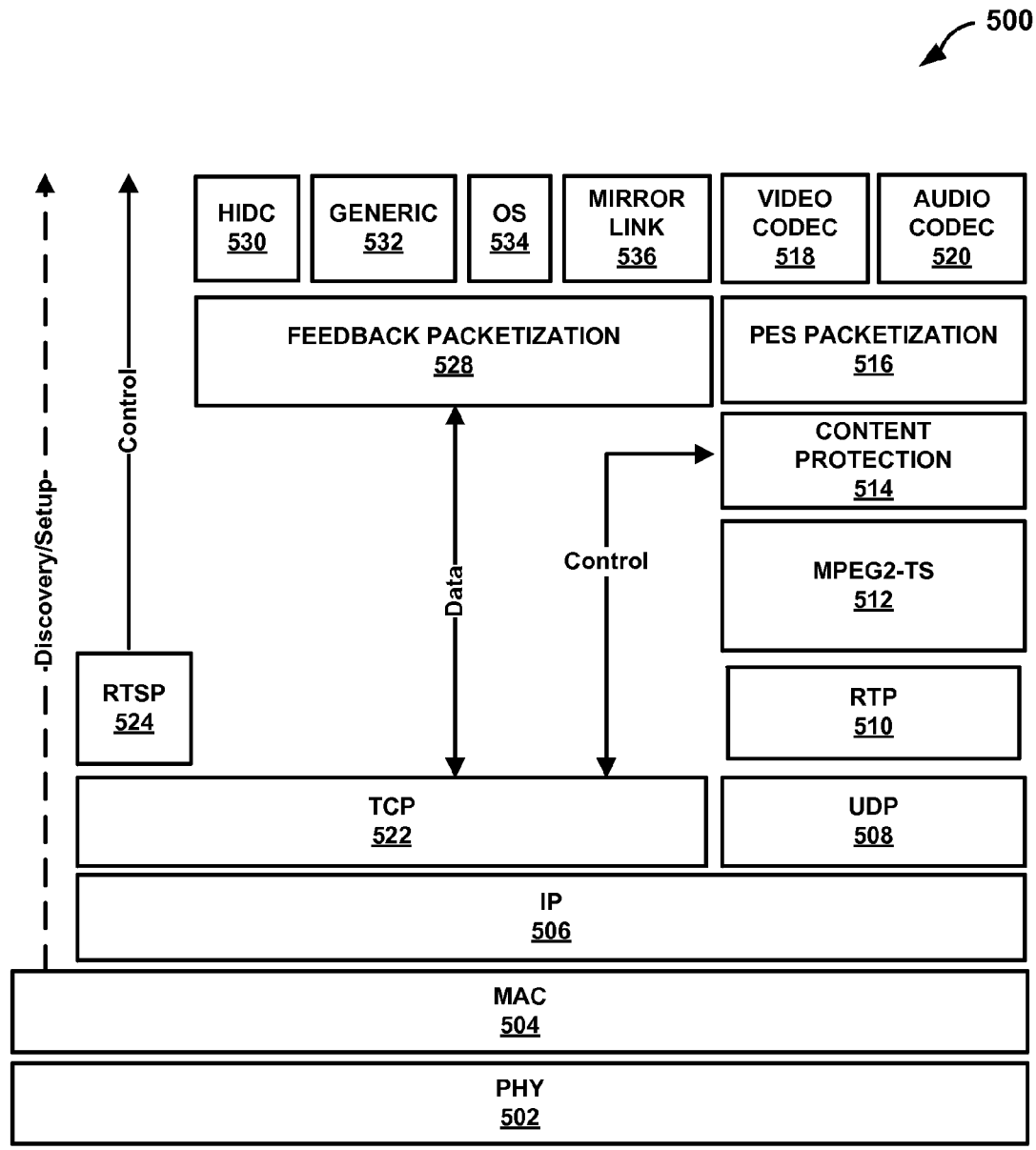
FIG. 8 is a block diagram illustrating an example of a data communication model or protocol stack for a system operating according to techniques of this disclosure.

FIG. 8 is a block diagram illustrating an example of a data communication model or protocol stack for a system, such as system 2 of FIG. 1 and/or system 50 of FIG. 2. Data communication model 500 illustrates the interactions between data and control protocols used for transmitting data between a source device and a sink device in an implemented WD system. In one example, system 100 may use data communications model 500. Data communication model 500 includes physical (PHY) layer 502, media access control (MAC) layer (504), internet protocol (IP) 506, user datagram protocol (UDP) 508, real time protocol (RTP) 510, MPEG2 transport stream (MPEG2-TS) 512, content protection 514, packetized elementary stream (PES) packetization 516, video codec 518, audio codec 520, transport control protocol (TCP) 522, real time streaming protocol (RTSP) 524, feedback packetization 528, human interface device constants 530, generic user inputs 532, performance analysis 534 and MirrorLink™ 536.

Physical layer 502 and MAC layer 504 may define physical signaling, addressing and channel access control used for communications in a WD system. Physical layer 502 and MAC layer 504 may define the frequency band structure used for communication, e.g., Federal Communications Commission bands defined at 2.4, GHz, 3.6 GHz, 5 GHz, 60 GHz or Ultrawideband (UWB) frequency band structures. Physical layer 502 and MAC 504 may also define data modulation techniques e.g. analog and digital amplitude modulation, frequency modulation, phase modulation techniques, and combinations thereof. Physical layer 502 and MAC 504 may also define multiplexing techniques, e.g., orthogonal frequency division multiplexing (OFDM), time division multi access (TDMA), frequency division multi access (FDMA), code division multi access (CDMA), or any combination of OFDM, FDMA, TDMA and/or CDMA. In one example, physical layer 502 and media access control layer 504 may be defined by a Wi-Fi (e.g., IEEE 802.11-2007 and 802.11n-2009x) standard, such as that provided by WFD. In other examples, physical layer 502 and media access control layer 504 may be defined by any of: WirelessHD, Wireless Home Digital Interface (WHDI), WiGig, and Wireless USB.

Internet protocol (IP) 506, user datagram protocol (UDP) 508, real time protocol (RTP) 510, transport control protocol (TCP) 522, and real time streaming protocol (RTSP) 524 define packet structures and encapsulations used in a WD system and may be defined according to the standards maintained by the Internet Engineering Task Force (IETF).

RTSP 524 may be used by source device 10 and sink device 20, e.g., to negotiate capabilities, establish a session, and session maintenance and management. Source device 10 and sink device 20 may establish the feedback channel using an RTSP message transaction to negotiate a capability of source device 10 and sink device 20 to support the feedback channel and feedback input category on the UIBC. The use of RTSP negotiation to establish a feedback channel may be similar to using the RTSP negotiation process to establish a media share session and/or the UIBC.

For example, source device 10 may send a capability request message (e.g., RTSP GET_PARAMETER request message) to sink device 20 specifying a list of capabilities that are of interest to source device 10. In accordance with this disclosure, the capability request message may include the capability to support a feedback channel on the UIBC. Sink device 20 may respond with a capability response message (e.g., RTSP GET_PARAMETER response message) to source device 10 declaring its capability of supporting the feedback channel. As an example, the capability response message may indicate a "yes" if sink device 20 supports the feedback channel on the UIBC. Source device 10 may then send an acknowledgement request message (e.g., RTSP SET_PARAMETER request message) to sink device 20 indicating that the feedback channel will be used during the media share session. Sink device 20 may respond with an acknowledgment response message (e.g., RTSP SET_PARAMETER response message) to source device 10 acknowledging that the feedback channel will be used during the media share session. As described above, in order to enhance MirrorLink™ using WFD functionality in one example, source device 10 may specify a 'udp_port' parameter in the 'wfd_uibc_capabilities' in the SET_PARAMETER Request sent to sink device 20.

Video codec 518 may define the video data coding techniques that may be used by a WD system. Video codec 518 may implement any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8 and High-Efficiency Video Coding (HEVC). It should be noted that in some instances WD system may either compressed or uncompressed video data.

Audio codec 520 may define the audio data coding techniques that may be used by a WD system. Audio data may be coded using multi-channel formats such those developed by Dolby and Digital Theater Systems. Audio data may be coded using a compressed or uncompressed format. Examples of compressed audio formats include MPEG-1, 2 Audio Layers II and III, AC-3, AAC. An example of an uncompressed audio format includes pulse-code modulation (PCM) audio format.

Packetized elementary stream (PES) packetization 516 and MPEG2 transport stream (MPEG2-TS) 512 may define how coded audio and video data is packetized and transmitted. Packetized elementary stream (PES) packetization 516 and MPEG-TS 512 may be defined according to MPEG-2 Part 1. In other examples, audio and video data may be packetized and transmitted according to other packetization and transport stream protocols. Content protection 514, may provide protection against unauthorized copying of audio or video data. In one example, content protection 514 may be defined according to High bandwidth Digital Content Protection 2.0 specification.

Feedback packetization 528 may define how user input and performance information is packetized. Feedback typically affects how subsequent media data is presented to the user at sink device 20, (e.g., zoom and pan operations) and how source device 10 processes (e.g., encodes and/or transmits) the media data to sink device 20.

Human interface device commands (HIDC) 530, generic user inputs 532, OS specific user inputs 534, and Mirror-Link™ user inputs 536, may define how types of user inputs are formatted into information elements. Human interface device commands 530 and generic user inputs 532 may categorize inputs based on user interface type (e.g., mouse, keyboard, touch, multi-touch, voice, gesture, vendor-specific interface or another interface type) and commands (e.g. zoom, pan, or another type of command) and determine how user inputs should be formatted into information elements.

In one example, human interface device commands 530 may format user input data and generate user input values based on defined user input device specifications such as USB, Bluetooth and Zigbee. Tables 1A, 1B and 1C provide examples of an HIDC input body format, HID Interface Type and HID Type values. In one example, human interface device commands (HIDC) 530 may be defined according to WFD. In Table 1A, the HID Interface Type field specifies a human interface device (HID) type. Examples of HID interface types are provided in Table 1B. The HID Type field specifies a HID type. Table 1C provides examples of HID types. The length field specifies the length of an HIDC value in octets. The HIDC includes input data which may be defined in specifications such as Bluetooth, Zigbee, and USB.

TABLE 1A

HIDC Body Format

| Field | Size (Octet) | Value |
| --- | --- | --- |
| HID Interface Type | 1 | HID Interface Type. See Table 1B |
| HID Type | 1 | HID Type. See Table 1C |
| Length | 2 | Length of HIDC value in octets |

TABLE 1A-continued

HIDC Body Format

| Field | Size (Octet) | Value |
| --- | --- | --- |
| HIDC Value | Variable | HIDC input data which is defined in other specifications such as Bluetooth, Zigbee, and USB. |

TABLE 1B

HIDC Interface Type

| Value | HID Interface Type |
| --- | --- |
| 0 | Infrared |
| 1 | USB |
| 2 | Bluetooth |
| 3 | Zigbee |
| 4 | Wi-Fi |
| 5-254 | Reserved |
| 255 | Vendor Specific HID interface |

TABLE 1C

HID Type

| Value | HID Type |
| --- | --- |
| 0 | Keyboard |
| 1 | Mouse |
| 2 | Single Touch |
| 3 | Multi Touch |
| 4 | Joystick |
| 5 | Camera |
| 6 | Gesture |
| 7 | Remote controller |
| 8-254 | Reserved |
| 255 | Vendor specific HID type |

In one example, generic user inputs 532 may be processed at the application level and formatted as information elements independent of a specific user input device. Generic user inputs 532 may be defined by the WFD standard. Tables 2A and 2B provide examples of a generic input body format and information elements for generic user inputs. In Table 2A, the Generic IE ID field specifies a Generic information element (IE) ID type. Examples of Generic IE ID types are provided in Table 2B. The length field specifies the length of a Generic IE ID value in octets. The describe field specifies details of a user input. It should be noted that for the sake of brevity that the details of all of the user inputs in the Describe field in Table 2A have not been described, but in some examples may include X-Y coordinate values for mouse touch/move events, ASCII key codes and control key codes, zoom, scroll, and rotation values. In one example, human interface device commands (HIDC) 530 and generic user inputs 532 may be defined according to WFD.

TABLE 2A

Generic Input Body Format

| Field | Size (Octet) | Value |
| --- | --- | --- |
| Generic IE ID | 1 | Input type, such as Zoom In, Scroll. See Table 2B |

TABLE 2A-continued

Generic Input Body Format

| Field | Size (Octet) | Value |
|---|---|---|
| Length | 2 | Length of the following fields in octets |
| Describe | Variable | The details of user inputs |

TABLE 2B

Generic Input Body Format

| Generic IE ID | Notes |
|---|---|
| 0 | Left Mouse Down/Touch Down |
| 1 | Left Mouse Up/Touch Up |
| 2 | Mouse Move/Touch Move |
| 3 | Key Down (See Table 3A) |
| 4 | Key Up (See Table 3B) |
| 5 | Zoom |
| 6 | Vertical Scroll |
| 7 | Horizontal Scroll |
| 8 | Rotate |
| 9-255 | Reserved |

Tables 3A-3B below illustrate examples of the Describe field of the Generic Input Type ID for the respective Key Down and Key Up inputs that are currently defined for the WFD standard.

TABLE 3A

Describe Field of the Generic Input Message for Key Down

| Field | Size (Octet) | Notes |
|---|---|---|
| Reserved | 1 | Reserved |
| Key code 1 (ASCII) | 2 | The key code of the first key down event. The basic/extended ASCII code uses the lower one byte. The higher one byte is reserved for future ASCII compatible key codes. The higher one byte shall be sent before the lower one byte. |
| Key code 2 (ASCII) | 2 | The key code for the second key down event. The value is set to 0x00 00 (NULL), if the second key code is not present. The basic/extended ASCII code uses the lower one byte. The higher one byte is reserved for future ASCII compatible key codes. The higher one byte shall be sent before the lower one byte. |

TABLE 3B

Describe Field of the Generic Input Message for Key Up

| Field | Size (Octet) | Notes |
|---|---|---|
| Reserved | 1 | Reserved |
| Key code 1 (ASCII) | 2 | The key code of the first key up event. The basic/extended ASCII code uses the lower one byte. The higher one byte is reserved for future ASCII compatible key codes. The higher one byte shall be sent before the lower one byte. |
| Key code 2 (ASCII) | 2 | The key code for the second key up event. The value is set to 0x00 00 (NULL), if the second key code is not present. The basic/extended ASCII code uses the lower one byte. The higher one byte is reserved for future ASCII compatible key codes. The higher one byte shall be sent before the lower one byte. |

As illustrated in Tables 3A-3B, the Describe Field of the Generic Input Message for both the Key Down and Key Up messages is used for communicating ASCII key codes. The Describe Field also includes a one Octet Reserved field. As described above, a UIBC between source device 10 and sink device 20 may be configured to accommodate MirrorLink™ or more generally car controls and an In-Vehicle Infotainment (IVI) system. Thus, in one example, the Reserved field may be used to accommodate MirrorLink™ For example, the Reserved field may indicate that a Key Down or Key Up input message includes information other than an ASCII key code. Information other than an ASCII key code may include information relating to or defined according to MirrorLink™. In one example, a Key Down and/or Key Up input message may be used for communicating a 32-bit binary ("bin") key. A 32-bit bin key may be used to indicate a car command, such as those described above, e.g., volume up. In one example, a Reserved field value of 0x00 may indicate that a Key Down or Key Up input messages includes the Key code 1 and Key code 2 fields as illustrated in Tables 3A and 3B and a Reserved field value other than 0x00 may indicate that the subsequent fields are not used for Key code 1 and Key code 2. In one example, a Reserved field value of 0x01 may indicate that the subsequent field is a 32-bit bin key. Table 4 illustrates an example where the Reserved Field value other 0x01 indicates a 32-bit bin key. In Table 4, the Reserved field is referred to as Key Encoding Type.

TABLE 4

32-Bit Binary Key

| Field | Size (Octet) | Notes |
|---|---|---|
| Key Encoding Type | 1 | Set to 0x01 to indicate the following is a 32-bit bin key. |
| 32-bit bin key | 4 | The key code of a 32-bit bin key. |

OS-specific user inputs 534 are device platform dependent. For different device platforms, such as iOS®, Windows Mobile®, and Android®, the formats of user inputs may be different. The user inputs categorized as interpreted user inputs may be device platform independent. Such user inputs are interpreted in a standardized form to describe common user inputs that may direct a clear operation. A wireless display sink and the wireless display source may have a common vendor specific user input interface that is not specified by any device platform, nor standardized in the interpreted user input category. For such a case, the wireless display source may send user inputs in a format specified by the vendor library. Forwarding user inputs may be used to forward messages not originating from a wireless display sink. It is possible that the wireless display sink may send such messages from a third device as forwarding user input, and can then expect the wireless display source to respond to those messages in the correct context.

MirrorLink™ user inputs 536 may represent a new input category for MirrorLink™, i.e., a new "input-cat" for an RTSP SET_PARAMETER request message. For example, user inputs, such as the adjustment of volume controls on a car console may be transmitted to a smart phone using MirrorLink™ user inputs 536. It should be noted that the reserved values in Tables 1A-1C and 2A-2B may be modified to include any of the user inputs described above with respect to an IVI system as a sink device. For example, values 8-254 in Table 1C may be modified to include a car volume control or any other user inputs included in a car, such as dashboard, steering wheel, or touch screen controls. Further, values 8-254 in Table 1B may be modified to include a MirrorLink™ device.

MirrorLink™ user inputs 536 may be divided into categories, as detailed in Table 5:

TABLE 5

MirrorLink ™ User Input Categories
Category

Touch input
Buttons
Knobs
Others/Reserved

The touch input category may include inputs from a touch- or presence-sensitive display for navigation, media controls (e.g., play, pause, stop, skip), etc. The buttons category may include inputs for buttons in the vehicle that may be pressed, such as those coupled to the vehicle head unit but located on a steering wheel or dash. The knobs category is similar to the buttons category but include inputs for knobs in the vehicle that can be rotated to change setting (e.g., volume control knobs).

In one or more examples, the functions described may be implemented in hardware, software, firmware, or any combination thereof. If implemented in software, the functions may be stored on or transmitted over as one or more instructions or code on a computer-readable medium. Computer-readable media may include computer readable storage media that is non-transitory or transitory communication media including any medium that facilitates transfer of a computer program from one place to another. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, Flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Example vehicles that can employ techniques of this disclosure include automobiles, trucks, watercrafts, aircrafts, all-terrain vehicles (ATV's), snowmobiles, motorcycles, tanks or other military vehicles, semi-trucks or other transportation vehicles, bulldozers, tractors or other heavy machinery, trains, golf carts, or any other types of vehicles. A wide variety of vehicle data and processing of such data is contemplated in examples according to this disclosure.

Various embodiments of the invention have been described. These and other embodiments are within the scope of the following claims.

What is claimed is:

1. A method of transmitting media data from a source device, the method comprising:
    establishing, with the source device, a first communication session between the source device and a sink device comprising a vehicle head unit, wherein the first communication session conforms to a communication protocol and is associated with a first wireless display service that conforms to a first wireless display protocol;
    discovering, with the source device and by the first communication session, the sink device;
    receiving, with the source device and by the first communication session, a control message from the sink device;
    in response to the control message, executing a second wireless display service with the source device;
    during operation of the first communication session associated with the first wireless display service, establishing with the source device a second communication session for the second wireless display service between the source device and the sink device, wherein the second wireless display service conforms to a second wireless display protocol; and
    transmitting, using the second communication session, media data from the source device to the sink device for output to an interface of the sink device.

2. The method of claim 1, wherein transmitting the media data from the source device to the sink device for output to an interface of the sink device comprises transmitting the media data from the second wireless display service executed by the source device to the sink device.

3. The method of claim 1, further comprising:
    transmitting, from the source device to the sink device, data defining a user interface that presents a user with one or more applications for execution,
    wherein the control message indicates the user has selected a first one of the one or more applications for execution, and
    wherein transmitting the media data from the source device to the sink device for output to an interface of the sink device comprising transmitting the media data in response to the control message.

4. The method of claim 1, wherein the vehicle head unit comprises a front console substantially accessible to a driver of a vehicle that includes the vehicle head unit and a rear console substantially inaccessible to the driver, the method further comprising:

transmitting the media data to the sink device for output to one of the front console or the rear console according to properties of the media data.

5. The method of claim 4, further comprising transmitting the media data only to the rear console when the vehicle is in motion.

6. The method of claim 1, wherein the first wireless display service comprises MirrorLink.

7. The method of claim 1, wherein the second wireless display service comprises Wi-Fi Display.

8. The method of claim 1, further comprising:
sending a Real Time Streaming Protocol (RTSP) message to the sink device, wherein the RTSP message identifies a user datagram protocol (UDP) port; and
receiving a command for the second communication session at the identified UDP port.

9. The method of claim 1, further comprising:
receiving a user input message from the sink device by the second communication session, wherein the user input message is based at least in part on a message defined according to a wireless display standard and includes a field indicating whether the message includes an ASCII key code or a 32-bit binary key; and
adjusting the transmission of media data according to the user input message.

10. A method of receiving media data with a sink device comprising a vehicle head unit, the method comprising:
establishing, with the sink device, a first communication session between the sink device and a source device, wherein the first communication session conforms to a communication protocol and is associated with a first wireless display service that conforms to a first wireless display protocol;
discovering, with the sink device and by the first communication session, the source device;
sending, with the sink device and by the first communication session, a control message to the source device to direct the source device to execute a second wireless display service;
during operation of the first communication session associated with the first wireless display service, establishing with the sink device a second communication session for the second wireless display service between the source device and the sink device, wherein the second wireless display service conforms to a second wireless display protocol;
receiving, with the sink device using the second communication session, media data from the source device; and
rendering the media data to an interface of the sink device.

11. The method of claim 10, wherein receiving the media data from the source device comprises receiving the media data from the second wireless display service.

12. The method of claim 10, further comprising:
receiving, with the sink device by the first communication session, data defining a user interface that presents a user with one or more applications for execution
wherein the control message indicates the user has selected a first one of the one or more applications for execution.

13. The method of claim 10, wherein the vehicle head unit comprises a front console substantially accessible to a driver of a vehicle that includes the vehicle head unit and a rear console substantially inaccessible to the driver, the method further comprising:
routing the media data with the vehicle head unit to one of the front console or the rear console according to properties of the media data.

14. The method of claim 13, further comprising routing the media data only to the rear console when the vehicle is in motion.

15. The method of claim 10, wherein the first wireless display service comprises MirrorLink.

16. The method of claim 10, wherein the second wireless display service comprises Wi-Fi Display.

17. The method of claim 10, further comprising:
receiving a Real Time Streaming Protocol (RTSP) message from the source device, wherein the RTSP message identifies a user datagram protocol (UDP) port; and
sending a command for the second communication session at the identified UDP port.

18. The method of claim 10, further comprising:
sending a user input message to the source device by the second communication session, wherein the user input message is based at least in part on a message defined according to a wireless display standard and includes a field indicating whether the message includes an ASCII key code or a 32-bit binary key; and
receiving media data adjusted according to the user input message.

19. A source device comprising:
a MirrorLink interface configured to establish a first communication session with a sink device comprising a vehicle head unit, wherein the first communication session conforms to a communication protocol and is associated with a first wireless display service that conforms to a first wireless display protocol,
wherein the MirrorLink interface is configured to discover, by the first communication session, a sink device and to receive a control message from the sink device; and
a Wi-Fi Display (WFD) source configured to, in response to the control message, execute a second wireless display service and, during operation of the first communication session associated with the first wireless display service, establish a second communication session for the second wireless display service with the sink device, wherein the second wireless display service conforms to a second wireless display protocol, and
wherein the WFD source is configured to transmit, using the second communication session, media data to the sink device for output to an interface of the sink device.

20. The source device of claim 19, wherein the WFD source is configured to transmit the media data from to the sink device for output to an interface of the sink device by transmitting the media data from the second wireless display service to the sink device.

21. The source device of claim 19,
wherein the MirrorLink interface is configured to transmit, to the sink device, data defining a user interface that presents a user with one or more applications for execution,
wherein the control message indicates the user has selected a first one of the one or more applications for execution, and
wherein the WFD source is configured to transmit the media data to the sink device for output to an interface of the sink device by being configured to transmit the media data in response to the control message.

22. The source device of claim 19,
wherein the sink device comprises a vehicle head unit comprising a front console substantially accessible to a driver of a vehicle that includes the vehicle head unit and a rear console substantially inaccessible to the driver, and wherein the WFD source is configured to transmit the media data to the sink device for output to one of the front console or the rear console according to properties of the media data.

23. The source device of claim 22, wherein the WFD source is configured to transmit the media data only to the rear console when the vehicle is in motion.

24. The source device of claim 19, wherein the first wireless display service comprises MirrorLink.

25. The source device of claim 19, wherein the second wireless display service comprises Wi-Fi Display.

26. The source device of claim 19,
wherein the WFD source is configured to send a Real Time Streaming Protocol (RTSP) message to the sink device, wherein the RTSP message identifies a user datagram protocol (UDP) port, and
wherein the WFD source is configured to receive a command for the second communication session at the identified UDP port.

27. The source device of claim 19, further comprising:
wherein the WFD source is configured to receive a user input message from the sink device by the second communication session, wherein the user input message is based at least in part on a message defined according to a wireless display standard and includes a field indicating whether the message includes an ASCII key code or a 32-bit binary key, and
wherein the WFD source is configured to adjust the transmission of media data according to the user input message.

28. A sink device comprising:
a MirrorLink interface configured to establish a first communication session with a source device, wherein the first communication session conforms to a communication protocol and is associated with a first wireless display service that conforms to a first wireless display protocol,
wherein the MirrorLink interface is configured to discover, by the first communication session, the source device and to send a control message to the source device to direct the source device to execute a second wireless display service; and
a Wi-Fi Display (WFD) sink configured to, during operation of the first communication session associated with the first wireless display service, establish a second communication session for the second wireless display service with the sink device, wherein the second wireless display service conforms to a second wireless display protocol,
wherein the WFD sink is configured to receive, using the second communication session, media data from the source device, and
wherein the WFD sink is configured to render the media data to an interface of the sink device.

29. The sink device of claim 28, wherein the MirrorLink interface is configured to receive the media data from the source device by receiving the media data from the second wireless display service.

30. The sink device of claim 28, further comprising:
wherein the MirrorLink interface is configured to receive, by the first communication session, data defining a user interface that presents a user with one or more applications for execution, and
wherein the control message indicates the user has selected a first one of the one or more applications for execution.

31. The sink device of claim 28, further comprising:
a vehicle head unit comprising a front console substantially accessible to a driver of a vehicle that includes the vehicle head unit and a rear console substantially inaccessible to the driver,
wherein the WFD sink is configured to route the media data to one of the front console or the rear console according to properties of the media data.

32. The sink device of claim 31, wherein the WFD sink is configured to route the media data only to the rear console when the vehicle is in motion.

33. The sink device of claim 28, wherein the first wireless display service comprises MirrorLink.

34. The sink device of claim 28, wherein the second wireless display service comprises Wi-Fi Display.

35. The sink device of claim 28,
wherein the WFD sink is configured to receive a Real Time Streaming Protocol (RTSP) message from the source device, wherein the RTSP message identifies a user datagram protocol (UDP) port, and
wherein the WFD sink is configured to send a command for the second communication session at the identified UDP port.

36. The sink device of claim 28,
wherein the WFD sink is configured to send a user input message to the source device by the second communication session, wherein the user input message is based at least in part on a message defined according to a wireless display standard and includes a field indicating whether the message includes an ASCII key code or a 32-bit binary key, and
wherein the WFD sink is configured to receive media data adjusted according to the user input message.

37. A source device comprising:
means for establishing a first communication session with a sink device comprising a vehicle head unit, wherein the first communication session conforms to a communication protocol and is associated with a first wireless display service that conforms to a first wireless display protocol;
means for discovering, by the first communication session, the sink device;
means for receiving, with the source device and by the first communication session, a control message from the sink device;
means for, in response to the control message, executing a second wireless display service with the source device;
means for, during operation of the first communication session associated with the first wireless display service, establishing a second communication session for the second wireless display service with the sink device, wherein the second wireless display service conforms to a second wireless display protocol; and
means for transmitting, using the second communication session, media data to the sink device for output to an interface of the sink device.

38. A sink device comprising:
means for establishing a first communication session with a source device, wherein the first communication session conforms to a communication protocol and is associated with a first wireless display service that conforms to a first wireless display protocol;
means for discovering, by the first communication session, the source device;

means for sending, with the sink device and by the first communication session, a control message to the source device to direct the source device to execute a second wireless display service;

means for, during operation of the first communication session associated with the first wireless display service, establishing a second communication session for the second wireless display service with the source device, wherein the second wireless display service conforms to a second wireless display protocol;

means for receiving, using the second communication session, media data from the source device; and means for rendering the media data to an interface.

39. A non-transitory computer-readable storage medium including instructions stored thereon that when executed cause one or more processors to:

establish, with a source device, a first communication session between a source device and a sink device comprising a vehicle head unit, wherein the first communication session conforms to a communication protocol and is associated with a first wireless display service that conforms to a first wireless display protocol;

discover, with the source device and by the first communication session, the sink device;

receive, with the source device and by the first communication session, a control message from the sink device;

in response to the control message, execute a second wireless display service with the source device:

during operation of the first communication session associated with the first wireless display service, establish with the source device a second communication session for the second wireless display service between the source device and the sink device, wherein the second wireless display service conforms to a second wireless display protocol; and transmit, using the second communication session, media data from the source device to the sink device for output to an interface of the sink device.

40. A non-transitory computer-readable storage medium including instructions stored thereon that when executed cause one or more processors to:

establish, with a sink device comprising a vehicle head unit, a first communication session between a sink device comprising a vehicle head unit and a source device, wherein the first communication session conforms to a communication protocol and is associated with a first wireless display service that conforms to a first wireless display protocol;

discover, with the sink device and by the first communication session, the source device;

send, with the sink device and by the first communication session, a control message to the source device to direct the source device to execute a second wireless display service;

during operation of the first communication session associated with the first wireless display service, establish with the sink device a second communication session for the wireless second display service between the source device and the sink device, wherein the second wireless display service conforms to a second wireless display protocol;

receive, with the sink device using the second communication session, media data from the source device; and render the media data to an interface of the sink device.

* * * * *